Sept. 10, 1946.     W. B. FRANKLIN     2,407,488
ISOMERIZATION PROCESS
Filed Jan. 22, 1944
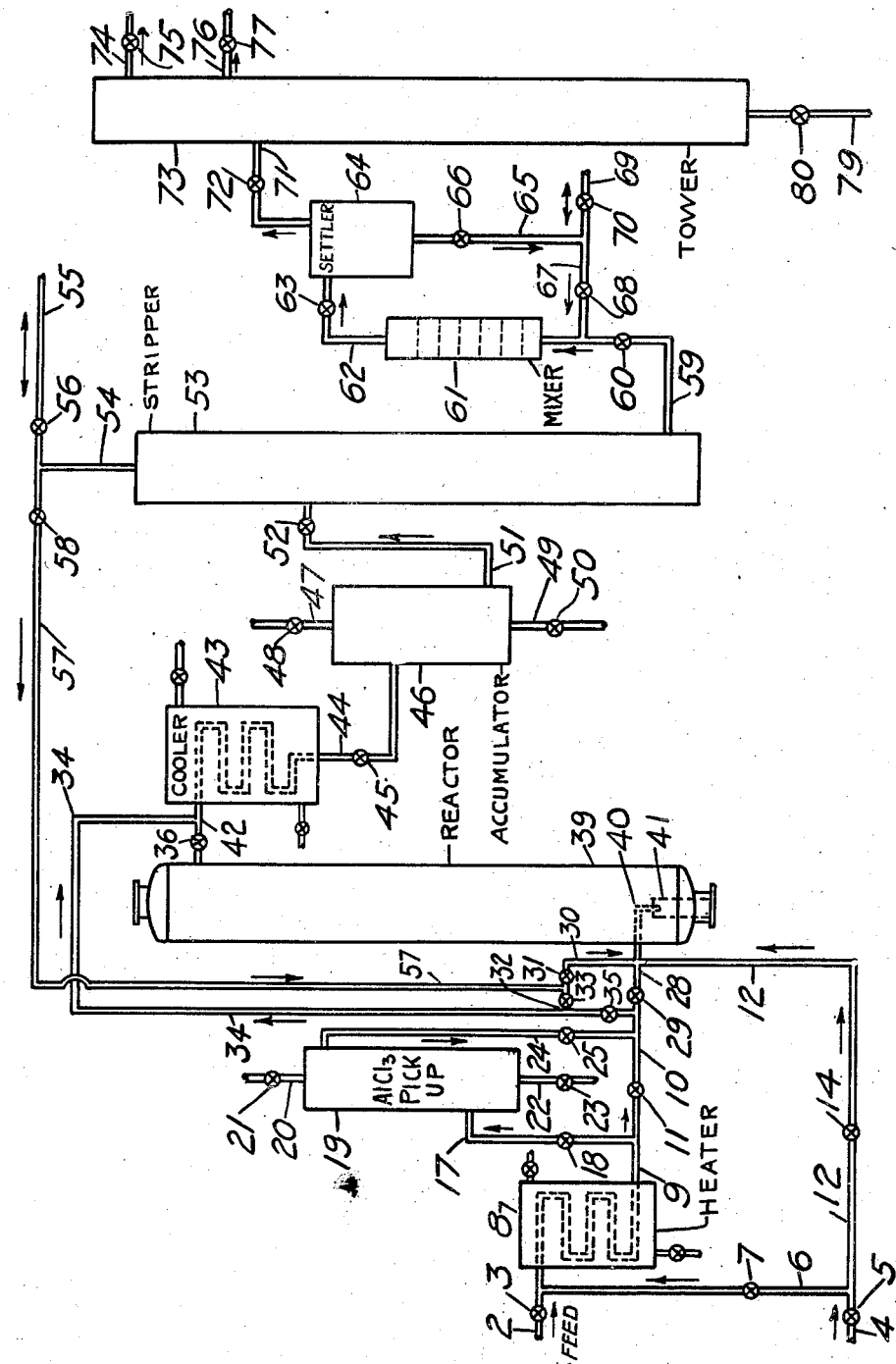
William B. Franklin Inventor
By     Attorney Patented Sept. 10, 1946

2,407,488

UNITED STATES PATENT OFFICE 2,407,488

ISOMERIZATION PROCESS

William B. Franklin, Baytown, Tex., assignor to Standard Oil Development Company, a corporation of Delaware Application January 22, 1944, Serial No. 519,306

4 Claims. (Cl. 260—683.5)

The present invention relates to a process for the catalytic isomerization of paraffinic hydrocarbons. More particularly, it relates to the catalytic isomerization of normal paraffinic hydrocarbons having at least four carbon atoms in the molecule wherein feed stocks predominating in these types of hydrocarbons are subjected to the action of Friedel-Crafts type catalysts in the presence of halogen-containing promoters under suitable vapor phase isomerization reaction conditions to produce the corresponding branched chain paraffinic hydrocarbons.

Straight chain paraffins of at least four carbon atoms per molecule have been isomerized in the presence of Friedel-Crafts type catalysts and halogen-containing promoters to produce branched chain paraffins. Numerous efforts have been made in the past to increase the efficiency of the catalysts employed, particularly in an effort to minimize the degradation of the catalyst as well as the degradation of the feed stock while in contact with the catalyst. By so doing, an increased catalyst life is attained as is manifested by a greater yield of isoparaffins per pound of catalyst employed. Particularly in commercial operations, petroleum refineries have large quantities of light hydrocarbon mixtures available, but there recently has sprung up a greater demand for the isoparaffinic hydrocarbons than for the normal paraffinic hydrocarbons, making it necessary to incorporate isomerization facilities in the ordinary refinery in order to obtain increased amounts of the isoparaffins which serve not only as blending agents for the normal paraffins but also as intermediates and reactants in the preparation of normally liquid hydrocarbons which also are useful in motor fuels.

The vapor phase isomerization of normal paraffins such as, for example, normal butane, to isobutane, takes place with ease in the presence of hydrogen halide promoters such as hydrogen chloride, where a catalyst comprising essentially aluminum chloride sorbed in an alumina is employed. Ordinarily a catalyst bed is made up of Porocel or some other suitable highly porous alumina. This sorptive alumina is usually first treated at temperatures ranging from 400° F. or 500° F. up to as high as 1100° F. or 1200° F. for a period of hours ranging between about 1 and about 5 or 6 in order to remove all traces of free water which may be contained in these alumina carriers, since it has been found that free water in the presence of aluminum chloride tends to hydrolyze the aluminum chloride and thus lower its overall catalytic activity. The catalyst mass employed may be formed by admixing granules or lumps of aluminum chloride with the desired quantities of dehydrated Porocel and the mass heated while passing therethrough a stream of inert vapor or gas such as nitrogen, carbon dioxide, hydrogen, methane, ethane, propane, butane and the higher paraffinic hydrocarbons. Or the mass may be produced in situ by charging a suitable reactor with a quantity of dehydrated Porocel and then employing the heretofore-mentioned vapors as a carrier for aluminum chloride vapors which are introduced and passed through the bed of Porocel. The Porocel then sorbs the aluminum chloride and the catalyst is thus formed. Still other methods have been employed in the past in order to make up the aluminum chloride-alumina catalyst composition for use in vapor phase and liquid phase normal paraffin isomerization reactions. Similar methods may be employed in reactivating a catalyst mass which has previously been employed in isomerization reactions but which has decreased materially in its catalytic activity and thus requires further treatment in order to bring it back to a practical isomerization level. This may be accomplished by adding vapors of aluminum chloride or lumps of aluminum chloride and vaporizing as heretofore described. No problem was apparent in accomplishing this treatment in pilot plant and laboratory scale operations, but considerable difficulty has been encountered in accomplishing the same operations where commercial scale units are concerned.

It is an object of the present invention to minimize catalyst degradation in a large scale normal paraffin isomerization operation involving the use of a catalyst mass of aluminum chloride sorbed in a porous alumina, while at the same time maintaining substantially the same conditions in the catalyst chamber during the reactivation or revivification of the catalyst mass as are maintained in the isomerization reaction proper. By such a procedure a minimum operational loss results both from the standpoint of time involved in bringing the partially spent catalyst back to a practical operating activity and in labor required to accomplish the revivification and reactivation of a partially spent aluminum chloride catalyst mass. It is a further object of the invention to minimize the overall time required to maintain a practical isomerizing catalyst mass at any desired practical operating level of activity and to thus secure improved yields of product per pound of aluminum chloride employed and per unit of time of operation of any particular unit.

In the past, admixtures of normal butane and hydrogen chloride, for example, have been fed to an isomerization reaction zone by passing the feed mixture through a superheater and into the catalyst mass at the desired reaction temperature under the desired rate of throughput. Once the isomerization catalyst mass becomes degraded in activity to a point where it is no longer practical to utilize the same in its partially deactivated condition, it is necessary either to dump the catalyst and employ freshly prepared catalyst or to suspend operation sufficiently long to reactivate or revivify that catalyst in order to bring it back to a practical level of isomerization activity. From an economic standpoint, it is preferable to employ the latter expedient. It is known to employ the admixture of normal butane and hydrogen chloride, that is, the feed stock to the isomerization unit, as a carrier medium for picking up sublimed aluminum chloride vapors and introducing them into the catalyst mass. It is also known to employ various other expedients for accomplishing the reactivation of the catalyst mass but in each case it has been necessary to alter the reaction zone containing the deactivated catalyst mass from the isomerization conditions customarily maintained on that reactor. By practicing these expedients, a lowering of the temperature of the catalyst bed is usually required in order to minimize the formation of sludge and hydrocarbon-aluminum chloride complexes which seem to form rapidly under such conditions with a resulting reduction in the life of the catalyst. In an effort to overcome these obstacles, a new method of reactivating the catalyst mass was tried in which the normal butane was permitted to pick up vapors of aluminum chloride and the resulting mixture was then introduced with hydrogen chloride into the isomerization catalyst bed under the isomerization conditions obtaining. Although the aluminum chloride was successfully sorbed in the pores of the porous alumina, a considerable complex formation took place at the point of entry of these vapors into the porous mass, resulting in a subsequent extremely high pressure drop across the catalyst bed even when further quantities of aluminum chloride vapors were subsequently left out of the feed stream going to the isomerization reaction zone. This difficulty became so serious that it was necessary to dump the entire catalyst bed, which, in the particular case, amounted to 52,800 pounds of calcined Porocel and about 5,600 pounds of aluminum chloride. This of course represented a serious economic loss.

The present invention is based upon the discovery that the isomerization reaction conditions do not have to be materially altered in order to successfully introduce vapors of aluminum chloride into a partially deactivated catalyst mass and at the same time the feed stock going to the isomerization reaction zone may be employed as the carrier mass for the aluminum chloride vapors. It has now been discovered that the essential feature of adding these vapors, using normal butane as the carrier therefor, to a catalyst bed maintained under isomerization reaction conditions lies in the fact that the hydrogen chloride must be withheld from addition to the reaction zone while the aluminum chloride vapors are being introduced. In other words, in a commercial operation no reaction conditions on the catalyst zone are altered over those employed in the isomerization reaction proper but the hydrogen chloride is withheld from its entry into the isomerization reaction zone while the normal butane is being fed, together with vapors of aluminum chloride, into the catalyst bed for the purpose of reactivating the same. It is not necessary, however, that the normal butane be employed as the carrier, but it is in practical operations the most convenient carrier since it or other suitable normal paraffins of at least four carbon atoms per molecule is being employed as the feed stock to the reactor. Any inert gas such as carbon dioxide, nitrogen, hydrogen and the like, may also be employed, provided, however, that no halogen-containing promoter is added to the reactor at the same time. Small amounts of hydrogen chloride will remain in the Porocel bed during the addition, but the introduction of the aluminum chloride vapors and carrier gas therein tends to purge the reactor of the unabsorbed hydrogen chloride contained in that bed and no difficulties such as the formation of aluminum chloride-hydrocarbon complexes develop. There is relatively no increase in pressure drop across the catalyst bed when this expedient is employed.

The accompanying drawing illustrates in more or less diagrammatic fashion a flow plan of a commercial isomerization unit, and for the purposes of illustration only the operation of this isomerization plant will be described with reference to a feed stock of normal butane, the promoter being hydrogen chloride, the catalyst aluminum chloride sorbed on Porocel. Various feed stocks, such as straight run naphthas, normal butane, normal pentane and higher straight chain paraffinic homologues, field butanes, normal butane cuts from alkylation units, and the like, are suitable feeds for the isomerization process. Also, other halogen-containing promoters which are well known in the art may be employed. Depending upon the impurities in the feed stock, it may be desirable to treat the same with concentrated sulfuric acid of 90–100% strength in order to remove water, sulfur and sulfur-containing impurities, and it is usually desirable after such treatment to percolate the feed stock, preferably in liquid phase, or in vapor phase, through a bed of sorptive alumina in order to remove the last traces of sulfuric acid, sulfur-containing esters and sulfonates, and the like, since they have been found to exert a deleterious influence upon the aluminum chloride.

Such a feed stock, in the absence of hydrogen chloride, and having a composition of

|  | Percent |
| --- | --- |
| $C_3$ and lighter | 0.0 |
| Normal butane | 96.5 |
| Isobutane | 3.0 |
| $C_5$ and heavier | 0.5 | is introduced into the system through line 2, controlled by valve 3, and flows through heater 8 where it is raised to a temperature of between about 220° F. and about 400° F. Anhydrous hydrogen chloride is introduced into the system through line 4, controlled by valve 5, passes through line 6, controlled by valve 7, and is admixed with the feed stock in line 2. The feed mixture then passes through the heater as before described and is introduced, by means of lines 9, 10 and 28, into the inlet sleeve 40 of the reactor 39 and passes into a catalyst bed substantially filling reactor 39 by first going through a perforated steel tube 41 which acts as a distributing means for the mixture. A perforated plate above the feed inlet may also serve as the support for the catalyst bed in place of tube 41. Reactor 39 is charged with about 52,800 pounds of a low iron content calcined Porocel of from 4 to 8 mesh and containing about 1.58% of volatile matter by reason of its having been pretreated to a temperature of about 1000–1100° F. for approximately one and one-half hours in order to remove any free water which might be evolved otherwise during the isomerization reaction. Granular aluminum chloride was dispersed evenly throughout the lower two-thirds of the Porocel, while the remaining one-third of the Porocel in the upper portion of the bed contained no aluminum chloride. The aluminum chloride was then sublimed and sorbed on the Porocel by blowing a portion of the normal butane vapor, heated to about 340° F., through the bed at a charged rate of about 4500 gallons per hour at atmospheric pressure until the temperature of the bed reached about 335–340° F. After reaching this temperature the treatment was continued for about 12 hours except the pressure within the reactor was maintained at 40–50 pounds per square inch. During the time the normal butane was being passed through the reactor as above described, valves 7 and 14 remained closed so that no hydrogen chloride except that which might be incidentally produced during the catalyst formation period was present in the reactor 39. After the period of catalyst formation, however, the hydrogen chloride was introduced through lines 4 and 6 so that the final feed composition entering line 28 and feed sleeve 40 contained between about 2 and about 8 weight per cent based on the normal butane being charged.

During the period of catalyst preparation, the reactor was maintained at a temperature slightly higher than that to be employed in the isomerization reaction proper, and upon the introduction of the hydrogen chloride the reaction temperature was allowed to drop to about 220° F. In general, a bottoms temperature of about 220–350° F. is desirable in reactor 39. The lower temperature is preferred for initial operation of the catalyst bed while the higher temperature may be used during later operation when the catalyst is less active. A feed rate through the reactor of between about 3000 and about 6500 gallons of normal butane per hour was maintained during the isomerization reaction and about 5600 pounds of aluminum chloride was employed in making up the initial catalyst mass. This amounted to, roughly, 10 weight per cent of aluminum chloride in the total catalyst mass. However, the catalyst mass may be operated satisfactorily if it contains between about 5 and about 20 weight per cent of aluminum chloride. The actual amount of aluminum chloride depends to a large extent upon the porosity of the specific porous alumina employed. It is not desirable, however, to maintain more aluminum chloride in the catalyst mass than may be completely sorbed therein under the isomerization conditions obtaining.

The reacted effluent passes from reactor 39 through line 42, containing valve 36. The reacted effluent is passed through cooler 43, wherein the temperature is reduced and the cooled mixture in liquid phase is then passed through line 44, controlled by valve 45, into the product accumulator 46 wherein any liquid or solid particles such as aluminum chloride or the degradation product of aluminum chloride with hydrocarbons may be withdrawn through the outlet 49, controlled by valve 50. Permanent gases which may have been formed in the system may be withdrawn through line 47, controlled by valve 48. The hydrocarbon reaction product is then passed through line 51, controlled by valve 52, into stripping column 53, wherein the hydrogen chloride and some hydrocarbon vapors are removed overhead through line 54 and may be withdrawn from the system through line 55, controlled by valve 56. Preferably, however, they are recycled to the reactor 39 through line 57, controlled by valve 58, and line 30, controlled by valve 31. The bottoms from stripper 53 are passed by means of line 59, controlled by valve 60, into mixer 61. Caustic soda solution or suitable alkaline material is introduced into the system through lines 67 and 69, controlled by valves 68 and 70 respectively, and is admixed with the bottoms from stripper 53 in line 59. Mixer 61 is provided with conventional mixing plates and the treatment in mixer 61 is designed to remove the last traces of aluminum chloride and hydrogen chloride contained in the product. This mixture is passed through line 62, controlled by valve 63, into settler 64, where the aqueous caustic solution introduced into the system though line 69 settles to the bottom and is withdrawn from settler 64 through line 65, controlled by valve 66. It may be either returned to the mixing chamber 61 through line 67, controlled by valve 68, or, if it is spent, it may be withdrawn from the system through line 69, controlled by valve 70. The neutralized hydrocarbon mixture is withdrawn as an upper layer from settler 64 through line 71, controlled by valve 72, and is passed into the fractionating tower 73 wherein the residual quantities of propane and lighter products may be taken overhead through line 74, controlled by valve 75; or, if there are none, then the tower may be operated so that the desired product of the reaction, namely, isobutane, is withdrawn through line 74, controlled by valve 75. If appreciable quantities of light degradation products are separated in fractionating tower 73, then the product of the reaction, namely, isobutane, may be withdrawn through line 76, controlled by valve 77. The bottoms from tower 73 comprise essentially normal butane together with small amounts of C5 and heavier paraffins. These may be withdrawn from the tower 73 through line 79, controlled by valve 80, and withdrawn from the system. Generally, however, these bottoms, comprising essentially normal butane, may be recycled to feed line 2. However, a distillation operation is desirable to remove the small amount of pentane or heavier hydrocarbons formed in reactor 39.

It may be desirable at times to introduce the hydrogen chloride in line 4, controlled by valve 5, into admixture with the normal butane feed at a point as close to the points of entry of the reactants into reactor 39 as possible. This may be accomplished by closing valve 7 and opening valve 14, permitting the hydrogen chloride to flow through line 12.

In such an operation as has just been described, wherein the unaltered catalyst mass was employed over a long period of time, the yield of isobutane in the product amounted to an average ranging between about 32% and 41% of the reacted mixture. However, eventually the yield of isobutane dropped below this figure, making it uneconomical to continue on-stream for a longer period of time without reactivating the catalyst mass. This reactivation was accomplished by withholding the hydrogen chloride entry into reactor 39. In other words, valves 7 and 14 were closed and the hydrogen chloride stream from stripper 53 flowed through lines 54, 57, 32 and 34 while valve 31, in line 30, and valve 35, in line 34, were completely closed. As aluminum chloride vapors are introduced into the reactor 39 in the manner to be hereinafter described, hydrogen chloride and hydrocarbon vapors may be vented from the system through line 47, controlled by valve 48, in order to maintain an even pressure on the reactor. Several thousand pounds of granular aluminum chloride are introduced into aluminum chloride pickup chamber 19 through line 20, controlled by valve 21. Valve 11 is partially closed and part of the normal butane feed, after passing through heater 8 and into line 9, passes through line 17, controlled by valve 18, and through aluminum chloride pickup chamber 19, which is maintained at a temperature of between about 220° F. and about 350° F. The vapors of aluminum chloride and normal butane pass from aluminum chloride pickup chamber 19 through line 24, controlled by valve 25, and are then introduced into reactor 39 by means of line 19 and line 28, controlled by valve 29, valves 36 and 31 remaining closed while valve 33 remains open. After between about 1000 and 2000 pounds of aluminum chloride have been added over a period of several hours, the aluminum chloride pickup drum 19 is by-passed and the catalyst temperature, as heretofore mentioned in connection with reactor 39, is reduced as stated therein, then the hydrogen chloride recycle in line 57 is permitted once again to flow into reactor 39. In other words, at any time that hydrogen chloride is flowing through line 28 no aluminum chloride is flowing into the system through line 24; and, conversely, if at any time aluminum chloride is flowing into the system through line 24, then valves 7, 14, 31 and 35 remain closed. This has been found highly advantageous, and, curiously enough, some residual hydrogen chloride is still in reactor 39, as evidenced by the fact that while the aluminum chloride vapor is being passed into reactor 39 some 20%–25% of isobutane is produced during the operation. However, the pressure drop, upon placing the reactor 39 on stream again, was substantially the same as that encountered in a fresh charge of catalyst to the reactor. Any liquid degradation products which may be formed in aluminum chloride pickup chamber 19 are removed from the system through line 22, controlled by valve 23. Whereas the per cent of isobutane found in the product prior to the introduction of further quantities of aluminum chloride vapor into the catalyst mass was about 30%, after the introduction of the aluminum chloride vapors in the amount of between about 1000 and 2000 pounds the conversion immediately returned to about 45% and continued so for an indefinite period even though the reactor temperature was lower after catalyst reactivation than it was before reactivation.

Having now thus fully described and illustrated the nature and character of the invention, what is desired to be secured by Letters Patent is:

1. A process which comprises continuously isomerizing normal paraffin of at least four carbon atoms per molecule in admixture with promotional amounts of hydrogen chloride under isomerization reaction conditions by passing said admixture through a catalyst bed comprising essentially aluminum chloride sorbed on an at least partially dehydrated porous alumina, said alumina being substantially incapable of evolving free water under the isomerization reaction conditions obtaining, continuing said isomerization until the catalyst activity falls below the desired level, withholding the introduction of hydrogen chloride into the catalyst bed while at the same time introducing vapors of aluminum chloride into the catalyst bed employing normal paraffin feed stock as the carrier therefor, the catalyst bed being all the while maintained substantially under isomerization reaction conditions, stopping the aluminum chloride introduction when the catalyst bed has had introduced thereto sufficient quantities of aluminum chloride so as to materially increase its isomerization activity but before saturation of the alumina with aluminum chloride under the isomerization conditions obtaining has been reached, and resuming the original isomerization process by feeding an admixture of normal paraffin feed stock and hydrogen chloride to the said catalyst bed substantially under the original isomerization reaction conditions.

2. A process as in claim 1 wherein the feed stock comprises essentially normal butane and the alumina is a dehydrated bauxite containing between about 7% and about 14% of aluminum chloride.

3. In a continuous isomerization process in which a normal paraffin of at least four carbon atoms per molecule in admixture with promotional amounts of hydrogen halide are contacted under isomerization reaction conditions with a catalyst comprising a porous support carrying aluminum halide, the step of replacing, at intervals indicated by decrease in activity of the catalyst, the hydrogen halide in the feed mixture with anhydrous aluminum halide without substantially altering the conditions of operation, the replacement in each instance being of sufficient duration to effect a substantial restoration of the activity of the catalyst.

4. A process for isomerizing a normal paraffin having at least four carbon atoms which comprises continuously feeding said paraffin in admixture with a promotional amount of hydrogen halide into a reaction vessel containing a catalyst comprising a porous support carrying an aluminum halide and maintained under suitable isomerization reaction conditions, continuously withdrawing a product from said reaction vessel, continuing this operation until the activity of the aluminum halide catalyst falls substantially below the desired level, replacing the hydrogen halide in the feed stock with anhydrous aluminum halide vapors without substantially altering the conditions in the reaction vessel, continuing the changed feed until the activity of the catalyst is restored to a substantial degree and then replacing aluminum halide in the feed by hydrogen halide.

WILLIAM B. FRANKLIN.